United States Patent [19]

Honl et al.

[11] Patent Number: 5,176,335

[45] Date of Patent: Jan. 5, 1993

[54] BELT RETRACTOR FOR VEHICLE SAFETY BELT SYSTEMS

[75] Inventors: Wolf-Dieter Honl, Böbingen; Hermann Weller, Alfdorf/Burgholz, both of Fed. Rep. of Germany

[73] Assignee: TRW Repa GmbH, Alfdorf, Fed. Rep. of Germany

[21] Appl. No.: 656,231

[22] Filed: Feb. 14, 1991

[30] Foreign Application Priority Data

Feb. 16, 1990 [EP] European Pat. Off. ........ 90103024-7

[51] Int. Cl.⁵ ............................................ B65H 75/48
[52] U.S. Cl. ...................................... 242/107.40 A
[58] Field of Search ............. 242/107, 107.3, 107.4 R, 242/109.4 H, 107.4 B, 107.4 C, 107.4 D, 107.5

[56] References Cited

U.S. PATENT DOCUMENTS

| | | | |
|---|---|---|---|
| 3,858,826 | 1/1975 | Sprecher | 242/107.4 D X |
| 3,944,163 | 3/1976 | Hayashi et al. | 242/107.4 D X |
| 4,249,709 | 2/1981 | Otzen et al. | 242/107.3 |
| 4,436,255 | 3/1984 | Matsui | 242/107.4 A |
| 4,518,132 | 5/1985 | Schmidt | 242/107.4 R X |
| 4,537,363 | 8/1985 | Thomas . | |
| 4,552,319 | 11/1985 | Gavagan et al. | 242/107.4 R X |

FOREIGN PATENT DOCUMENTS 2536661 1/1984 France .

Primary Examiner—Daniel P. Stodola
Assistant Examiner—John P. Darling
Attorney, Agent, or Firm—Tarolli, Sundheim & Covell

[57] ABSTRACT

When required a quasi-static blocking function is achieved in a fundamentally conventional belt retractor with vehicle-sensitive and/or webbing-sensitive blocking mechanism comprising a control disc (16) which is provided at its outer periphery with a control toothing (18) and by the movement of which relatively to the belt spool (12) the blocking mechanism is activatable. For this purpose a feeler (26) is held in spring-resilient engagement with the outer periphery of the belt coil. An actuating arm (34) of a control pawl (24) pivotally mounted on the housing (10) cooperates with control faces of said feeler (26). The control pawl (24) is movable between a first stable position in which it engages with its pawl tip (30) into the control toothing (18) and a second stable position in which it is moved out of the region of the control toothing. With its control faces the feeler (26) following the outer diameter of the webbing coil (B) moves the control pawl (24) into its first stable position when the outer diameter of the webbing coil has reached a predetermined minimum value and into its second stable position when said outer diameter has reached a predetermined intermediate value.

6 Claims, 5 Drawing Sheets

BELT RETRACTOR FOR VEHICLE SAFETY BELT SYSTEMS

The invention relates to a belt retractor for vehicle safety belt systems having a belt spool rotatably mounted in the housing of the belt retractor for taking up the webbing and a vehicle-sensitive and/or webbing-sensitive blocking mechanism which comprises a control disc which is provided at its outer periphery with a control toothing and by the rotation of which relatively to the belt spool the blocking mechanism can be activated.

Belt retractors of this type are known in numerous constructions. As long as the blocking mechanism is not activated in vehicle-sensitive or webbing-sensitive manner the webbing can be freely withdrawn from the retractor. This corresponds to the desired function of an automatic belt which leaves the vehicle occupant unrestricted in his freedom of movement as long as there is no need for the restraining function.

However, it is not possible with such a safety belt to secure articles such as loads or children's seats in such a manner that they are held immovably on the vehicle seat. For such uses static safety belts are required, i.e. conventional belts which have an adjustable but then fixedly defined length.

Belt retractors are also already known which in dependence upon the amount of webbing rolled onto the belt spool can be switched between a normal retractor function and a blocking function in which although they take up the webbing they block any further webbing withdrawal. Such belt retractors may be referred to as quasi-static systems. For switching between the two functions of the belt retractor complicated gear mechanisms or cam discs with cam followers are required.

The invention is based on the problem of providing a conventional belt retractor of the type mentioned at the beginning in the simplest possible manner with the minimum possible expenditure with a means which permits switching between the normal retracting function and a quasi-static blocking function, whilst enabling the fundamental construction of the belt retractor to remain unchanged and the vehicle-sensitive and/or webbing-sensitive blocking function unimpaired.

This problem is solved according to the invention in a belt retractor of the type mentioned at the beginning in that a feeler held spring-resiliently on the outer periphery of the webbing coil comprises control faces with which at least one actuating arm of a control pawl pivotally mounted on the housing cooperates, that the control pawl is movable between a first stable position in which it engages with its pawl tip into the control toothing and a second stable position in which it is moved out of the region of the control toothing and that the feeler following the outer diameter of the webbing coil with its control faces moves the control pawl into its first stable position when the outer diameter of the webbing coil has reached a predetermined minimum value and into its second stable position when said outer diameter has reached a predetermined intermediate value. In the belt retractor according to the invention to activate the blocking function the already present control disc is employed which in conventional belt retractors is provided for activating the vehicle-sensitive blocking and into the control toothing of which a trigger pawl movable by an inertia sensor engages in vehicle-sensitive manner. The additional control pawl provided according to the invention cooperates with the same control toothing in order when required to stop the control disc and activate the blocking movement by a then effected relative rotation between belt spool and control disc. This additional control pawl is a very simple component which is uncritical in its manufacture and mounting, as is the feeler which is provided for the actuation thereof and which can be formed as pivotally mounted lever or translationally displaceable feeler body. Incorporation of these elements into the already existing constructions of belt retractors does not present any difficulty and involves only slight expenditure.

Advantageous further developments of the invention are set forth in the subsidiary claims.

Further features and advantages of the invention will be apparent from the following description of several embodiments and from the drawings to which reference is made and in which.

Figure 1:
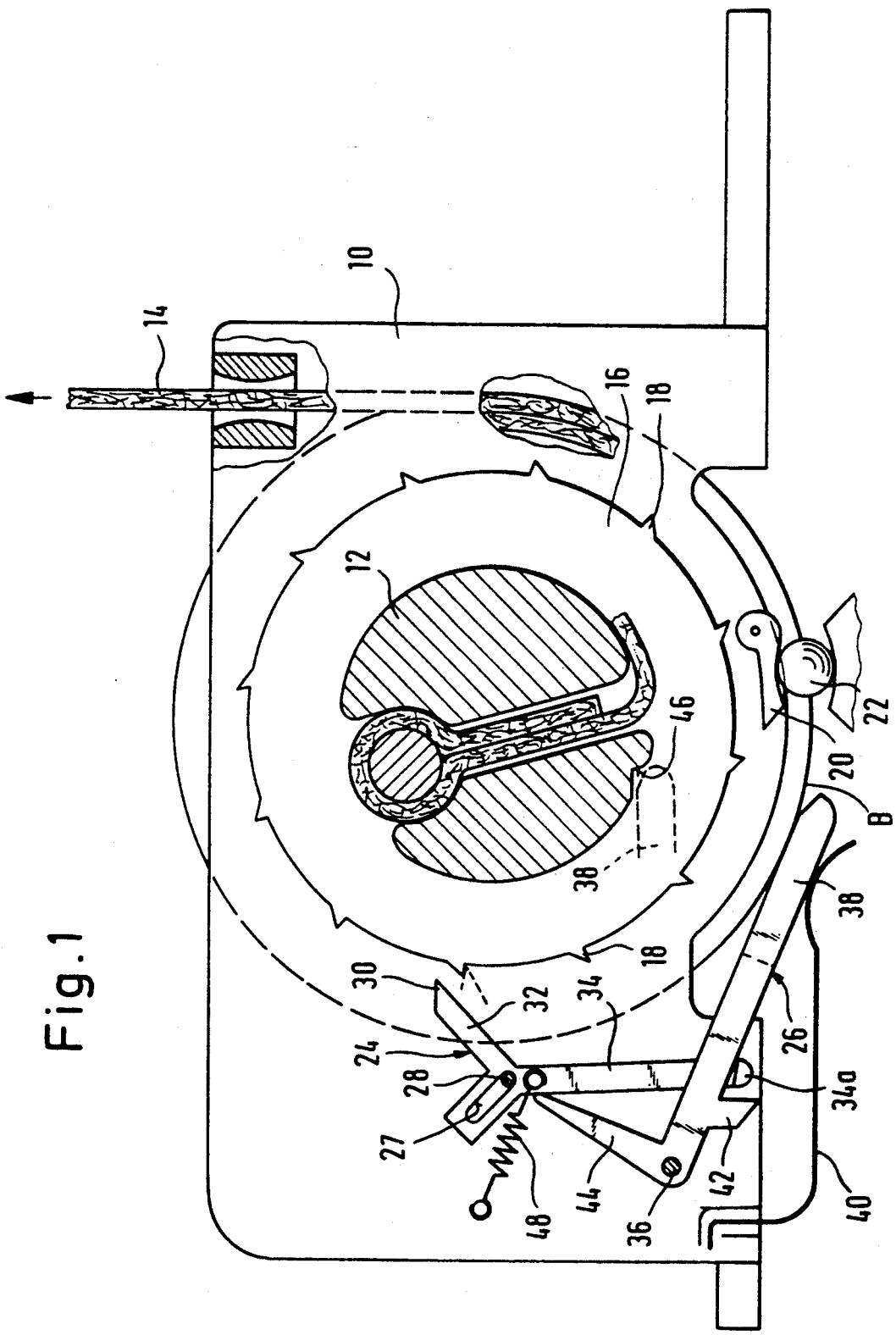
FIG. 1 shows schematically in side view a belt retractor according to a first embodiment.

A belt spool 12 is rotatably mounted between the side plates of a housing 10 of the belt retractor. The webbing 14 is wound onto said belt spool 12. A control disc 16 which is provided at its outer periphery with control teeth 18 is rotatable to a limited extent relatively to the belt spool 12. The control disc 16 serves for actuation of a conventional and therefore not illustrated blocking mechanism. The vehicle-sensitive activation of said blocking mechanism is effected in that a release pawl 20 which is indicated schematically in FIG. 1 and bears on an inertia sensor in the form of an inertia ball 22 is raised by movement of said inertia sensor and moved into the path of movement of the control teeth 18. The control disc is then prevented from rotating by the release pawl 20 so that on further webbing withdrawal a relative rotation occurs between the control disc 16 and belt spool 12. This relative rotation is converted to a shift movement by which a locking bar is activated for blocking the belt spool. If the control disc 16 is equipped with a suitable mass inertia it can also effect a webbing-sensitive blocking in that due to mass inertia it trails the rotation of the belt spool.

The existing drive system for the vehicle-sensitive and/or webbing-sensitive blocking mechanism is used in the belt retractor according to the invention for the additional purpose of imparting a quasi-static blocking function to said retractor. In this quasi-static blocking function webbing can only be taken up but not withdrawn so that articles which are to be immovably fixed can be secured on a vehicle seat, for example loads or children's seats. In the embodiment shown in FIG. 1 for this additional function only two elements are required: an additional control pawl 24 and a sensor or feeler 26. The additional control pawl 24 forms a two-armed lever which is mounted pivotally and also translationally displaceable to a limited extent on a housing-fixed pin 28 by means of a slot 27. The pawl tip 30 is formed on the one lever arm 32 whilst the second lever arm 34 forms an actuating arm cooperating with the feeler 26. Said feeler 26 is in turn formed as two-armed lever and pivotally mounted on a housing-fixed pin 36. The first lever arm 38 is pressed by a leaf spring 40 resiliently against the outer periphery of the webbing coil which is indicated in the drawing by the letter "B". The actuating arm 34 of the control pawl 24 engages with a lateral lug 34a behind the lever arm 38 of the feeler 26 and bears on one of the control faces thereof which is formed by the outer side of said lever arm 38. A further control face is formed on a lateral lug 42 of the lever arm 38. A further control face of the feeler 26 is formed on the end of its second lever arm 44.

The coil body of the belt spool 12 shown in section in FIG. 1 is provided at its outer periphery with a recess 46 into which when the webbing is unwound the free end of the lever arm 38 of the feeler 26 can partially dip.

The control pawl 24 is spring loaded by a tension spring 48, which is hooked at one end into the housing and with its other end engages the lever arm 34 of the control pawl 24 in the vicinity of the pin 28, in such a manner that the pawl tip 30 tends to move in the direction towards the outer periphery of the control disc 16. The control pawl 24 is nevertheless disposed in a stable position out of engagement with the control teeth 18 of the control disc 16 as long as the feeler 26, as indicated in full lines in FIG. 1, bears on a webbing coil B having or exceeding a predetermined minimum outer diameter. In the embodiment shown this minimum outer diameter is not exceeded until the webbing is completely unwound from the belt spool 12. The lever arm 38 is then disposed in the position indicated in dashed line in FIG. 1. In this position the free end of the lug 42 of the lever arm 38 is raised enough to permit the lug 34a at the free end of the lever arm 34 to move clockwise beyond said lug 42. At the same time the free end of the lever arm 44 has also released the lever arm 34 of the control pawl 24. Under the action of the tension spring 48 the control pawl 24 is now pivoted clockwise until its pawl tip 30 moves into the path of movement of the control teeth 18 at the outer periphery of the control disc 16. If a relative movement now occurs between the control disc 16 and belt spool 12 the blocking function is activated. As a result no more webbing can be withdrawn. On the other hand, the webbing can be coiled up because the pawl tip 30 and the control teeth 18 are adapted in form to each other in such a manner that a blocking action occurs only in the webbing withdrawal direction.

For cancelling the quasi-static blocking function the webbing is thus first completely withdrawn from the belt spool 12. Only when the free end of the lever arm 38 has dipped into the recess 46 will the control pawl 24 be released for engagement in the control teeth 18 at the outer periphery of the control disc 16. The webbing is now placed round the article to be secured and the insert tongue inserted into a belt lock; the webbing is released so that it is taken up on the belt spool 12. During this operation the control pawl 24 is in a stable engagement position so that the quasi-static blocking function is retained. Now, to operate the belt retractor again with the vehicle-sensitive and/or webbing-sensitive blocking function said webbing is almost completely taken up until the outer diameter of the belt coil B has reached a predetermined intermediate value. In the process of the coiling up the lever arm 38 of the feeler 26 is pivoted clockwise. To enable the lug 34a at the end of the lever arm 34 of the control pawl 24 to spring back again behind the lug 42 on the lever arm 48 a displacement of the control pawl must take place in which the slot 26 serves as guide. After execution of the combined translational and pivot movement necessary for this purpose the feeler 26 and control pawl 24 are again in the position shown in FIG. 1; in this state the control pawl 24 is held by the free end of the lever arm 44 engaging thereon and by engagement of its lug 34a on the lever arm 38 in a stable position out of engagement with the control teeth 18 of the control disc 16.

In all the further embodiments described hereinafter only the configuration of the control pawl and the feeler are different to FIG. 1 and consequently it will not be necessary to describe the identical features again.

Figure 2:
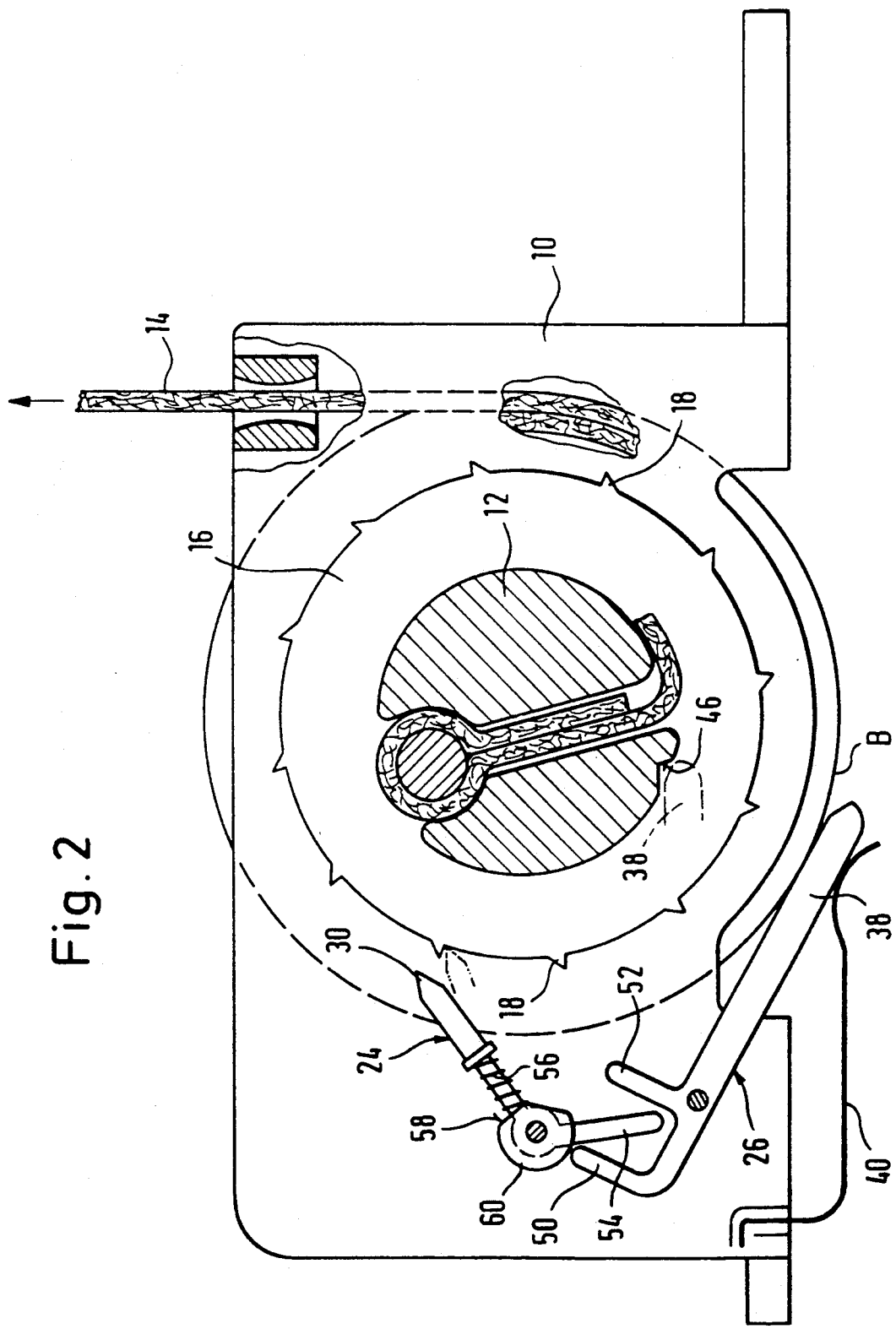
FIG. 2 is an analogous side view of another embodiment.

In the embodiment of FIG. 2 the feeler 26 forms a two-armed lever of which the lever arm 38 is applied resiliently by the leaf spring 40 to the outer periphery of the webbing coil B whilst the other lever arm is provided with a fork-like structure comprising two spaced apart fingers 50, 52. An actuating arm 54 of the control pawl 24 formed as two-armed lever engages into the space between said two fingers 50, 52. On the lever arm of the control pawl 24 having the pawl tip 30 at its free end a pressure spring 56 bears. The pressure spring 56 bears with its other end on a control face 58 of a housing-fixed configuration 60. Said control face 58 is formed so that the control pawl 24 is movable by overcoming an over-deadcentre position between two stable positions. In the first position shown in FIG. 2 in full lines the pawl tip 30 is out of engagement with the control teeth 18. In the second stable position the pawl tip 30 engages into the path of movement of the control teeth 18. The control pawl 24 is switched between said two positions via the fork-like structure which is formed by the two fingers 50, 52 of the feeler 26 and cooperates with the actuating arm 54 of the control pawl 24.

In this embodiment the manipulation of the belt retractor is the same as in that of FIG. 1 and will therefore not be described again.

Figure 3:
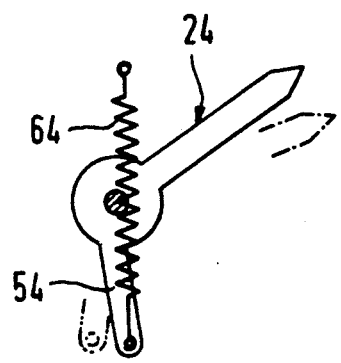
FIGS. 3 and 4 show two variants of the embodiment according to FIG. 2.

In the constructional variant according to FIG. 3 the control pawl 24 is of fundamentally the same shape as in FIG. 2 but is under the action of a tension spring 64 which tends to move it into one of its two stable positions with overcoming of a middle deadcentre position which is defined by the action direction of the spring 64 with respect to the position of the pivot axis of the control pawl 24. As can be seen in FIG. 3 the spring 64 engages on one side on the free end of the actuating arm 54 and on the other on the housing 10 of the belt retractor.

Figure 4:
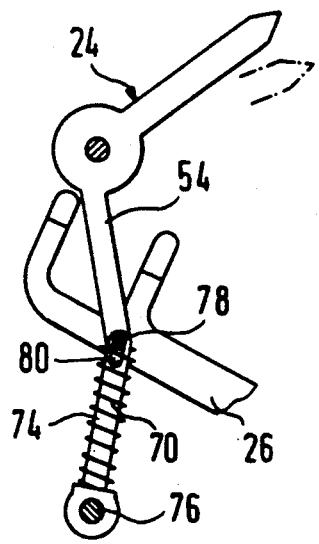

In the constructional variant according to FIG. 4 the two stable positions of the control pawl 24 are achieved by using a pressure spring 70 in combination with an auxiliary lever 74 which is pivotal about a housing-fixed pin 76 and on which the pressure spring 70 engages with its one end. The other end of the pressure spring 70 engages a coupling pin 78 at the end of the actuating arm 54 of the control pawl 24. Said coupling 78 engages into a slot 80 at the free end of the auxiliary lever 74 so that the auxiliary lever 74 and the actuating arm 54 cooperate with each other in the manner of a toggle lever joint with clearance. The switching of the control pawl 24 between its two stable positions, overcoming a deadcentre position, is once again effected by a fork-like structure on the one lever arm of the feeler 26.

Figure 5:
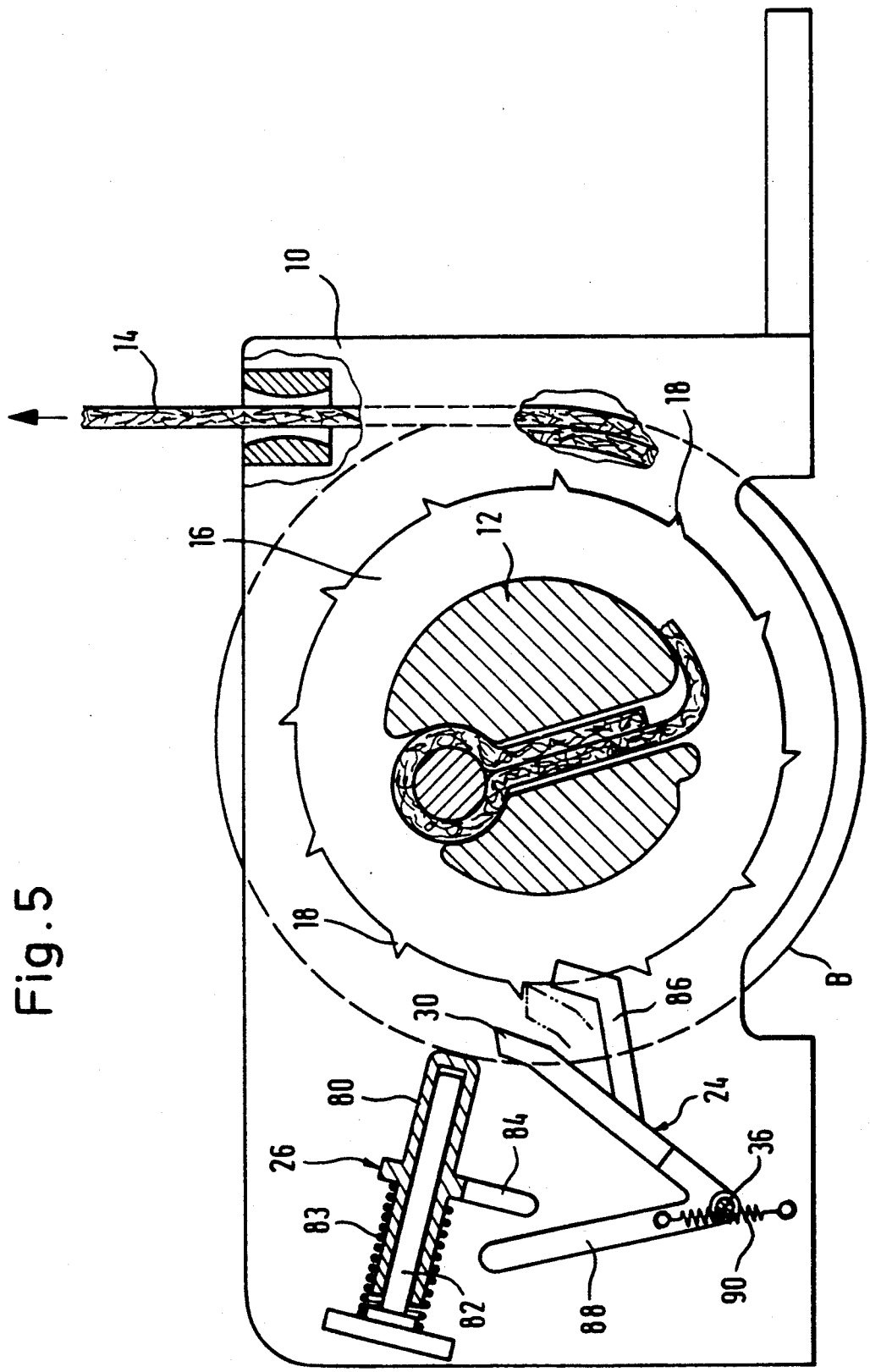
FIGS. 5 and 6 show two further embodiments of the belt retractor.

In the embodiment according to FIG. 5 the feeler 26 is formed by a translationally displaceable feeler pin 80 which is guided on a housing-fixed guide structure 82 for translational displacement in the direction towards the belt coil B and away from the latter. By a pressure spring 82 the free end of the feeler pin 80 is held in engagement with the outer periphery of the belt coil B. The feeler pin 80 is provided with a laterally projecting actuating arm 84. The control pawl is constructed as two-armed lever, the lever arm of which provided with the pawl tip 30 additionally carrying a first actuating arm 86. The other lever arm forms a second actuating arm 88. The two actuating arms 86, 88 cooperate with the actuating arm 34 of the feeler pin 80. The control pawl pivotal between two stable positions about its bearing pin 36 is urged by a tension spring 90, which is arranged and acts fundamentally as in the constructional variant according to FIG. 3, to one of its two stable positions, a deadcentre position having to be overcome for movement between the two positions.

The handling with this embodiment is the same as with the belt retractors according to FIGS. 1 and 2.

Figure 6:
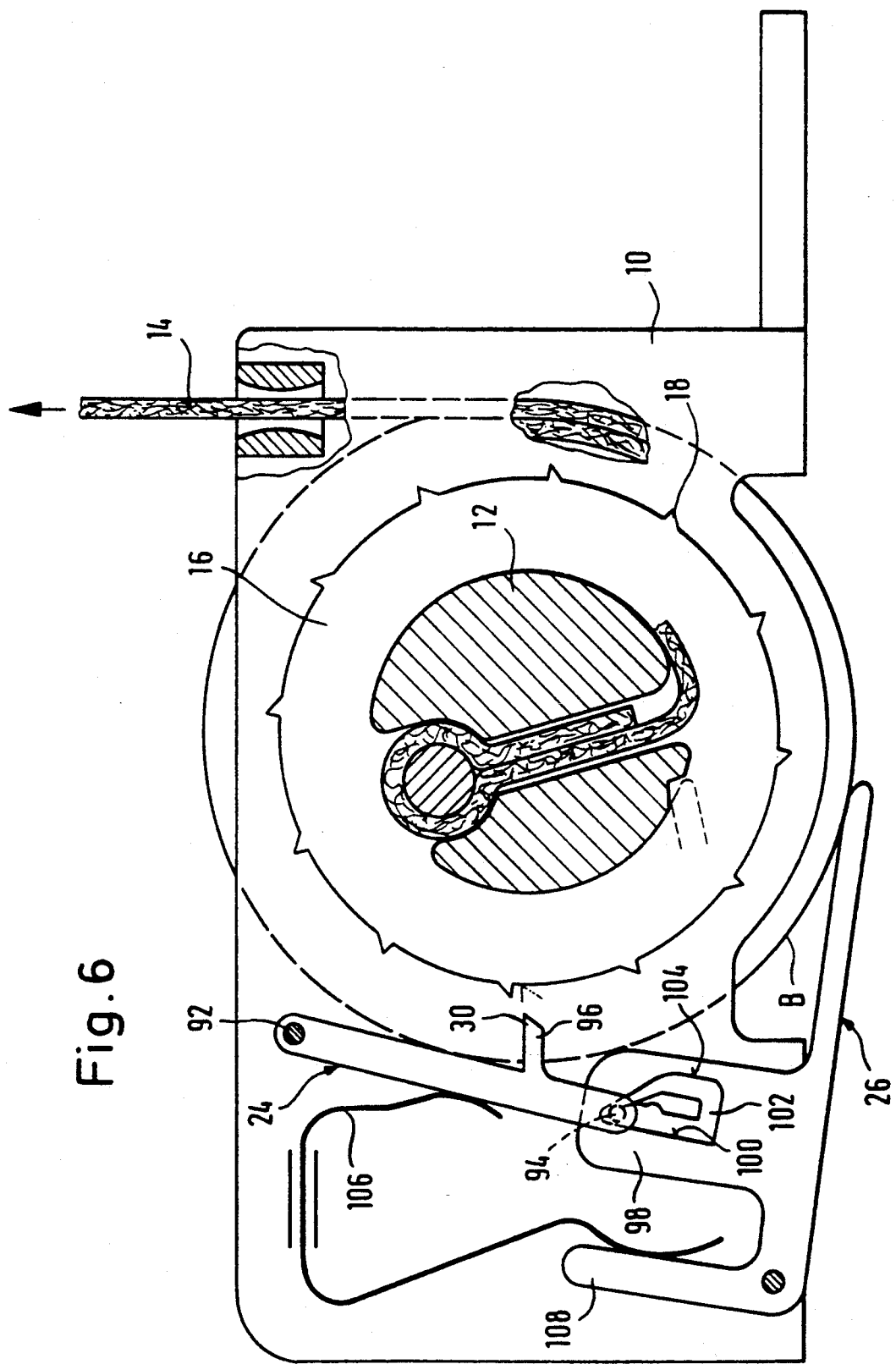

In the embodiment according to FIG. 6 the control pawl 24 is formed as single-arm lever which at its one end is pivotally mounted on a housing-fixed bearing pin 92 and at its free end carries a guide pin 94. The control tip 30 is formed at the end of a lateral lug 96 of the control pawl 24. The guide pin 94 cooperates with a slide guide of the feeler 26. Said slide guide is formed in a lateral jib 98 of the feeler 26. The jib 98 comprises a cutout 100 of which the boundary face forms a guide passage 104 with a resilient elastically yieldable part 102. The guide pin 94 slides in said guide track 104, the shape of which is chosen such that the feeler 26 moves the control pawl 24 in the desired manner and in dependence upon the outer diameter of the belt coil B to and fro between its two stable positions. With its one end a leaf spring 106 clamped at the housing presses the control pawl 24 in the direction of its engagement position and with its other end presses against an arm 108 of the feeler 26 to apply the latter resiliently to the outer periphery of the webbing coil B. The handling with this embodiment is the same as with the belt retractors previously described.

We claim:

1. A belt webbing retractor for a vehicle safety belt system having a belt spool (12) rotatably mounted in a housing (10) of the retractor for taking up webbing and a belt withdrawal blocking mechanism which comprises a control disc (16) having at its outer periphery control teeth (18) and which is rotatable relative to the belt spool (12) to activate the blocking mechanism, characterized in that:
 a feeler (26) biased into engagement with the outer periphery of the webbing coil (B) has control faces with which at least one actuating arm (34; 54) of a control pawl (24) pivotally mounted on the housing (10) cooperates;
 the control pawl (24) is movable between a first stable position in which its pawl tip (30) engages the control teeth (18) and a second stable position in which it is moved away from the control teeth (18);
 the feeler (26) following the outer diameter of the webbing coil (B) moves the control pawl (24) into its first stable position when the outer diameter of the webbing coil (B) has reached a predetermined minimum value and into its second stable position when said outer diameter has reached a predetermined intermediate value; and that
 said belt spool has a drum portion with surfaces defining a recess in which a sensing face of said feeler is received when the belt webbing has been almost completely unwound from said drum portion of said belt spool.

2. A belt webbing retractor for a vehicle safety belt system having a belt spool (12) rotatably mounted in a housing (10) of the retractor for taking up webbing and a belt withdrawal blocking mechanism which comprises a control disc (16) having at its outer periphery control teeth (18) and which control disc is rotatable relative to the belt spool (12) to activate the blocking mechanism, characterized in that:
 a feeler (26) biased into engagement with the outer periphery of the webbing coil (B) has control faces with which at least one actuating arm (34; 54) of a control pawl (24) pivotally mounted on the housing (10) cooperates;
 the control pawl (24) is movable between a first stable position in which its pawl tip (30) engages the control teeth (18) and a second stable position in which it is moved away from the control teeth (18);
 the feeler (26) following the outer diameter of the webbing coil (B) moves the control pawl (24) into its first stable position when the outer diameter of the webbing coil (B) has reached a predetermined minimum value and into its second stable position when said outer diameter has reached a predetermined intermediate value; and that
 the feeler (26) includes a feeler body (80) guided movably for translational displacement towards and away from the webbing coil.

3. A belt webbing retractor for a vehicle safety belt system having a belt spool (12) rotatably mounted in a housing (10) of the retractor for taking up webbing and a belt withdrawal blocking mechanism which comprises a control disc (16) having at its outer periphery control teeth (18) and which control disc is rotatable relative to the belt spool (12) to activate the blocking mechanism, characterized in that:
 a feeler (26) biased into engagement with the outer periphery of the webbing coil (B) has control faces with which at least one actuating arm (34; 54) of a control pawl (24) pivotally mounted on the housing (10) cooperates;
 the control pawl (24) is movable between a first stable position in which its pawl tip (30) engages the control teeth (18) and a second stable position in which it is moved away from the control teeth (18);
 the feeler (26) following the outer diameter of the webbing coil (B) moves the control pawl (24) into its first stable position when the outer diameter of the webbing coil (B) has reached a predetermined minimum value and into its second stable position when said outer diameter has reached a predetermined intermediate value; and that
 the control faces of the feeler (26) form a control passage (104) within which the actuating arm of the control pad is guided for movement.

4. A belt webbing retractor for a vehicle safety belt system having a belt spool (12) rotatably mounted in a housing (10) of the retractor for taking up webbing and a belt withdrawal blocking mechanism which comprises a control disc (16) having at its outer periphery control teeth (18) and which control disc is rotatable relative to the belt spool (12) to activate the blocking mechanism, characterized in that:
 a feeler (26) biased into engagement with the outer periphery of the webbing coil (B) has control faces with which at least one actuating arm (34; 54) of a control pawl (24) pivotally mounted on the housing (10) cooperates;

the control pawl (24) is movable between a first stable position in which its pawl tip (30) engages the control teeth (18) and a second stable position in which it is moved away from the control teeth (18);

the feeler (26) following the outer diameter of the webbing coil (B) moves the control pawl (24) into its first stable position when the outer diameter of the webbing coil (B) has reached a predetermined minimum value and into its second stable position when said outer diameter has reached a predetermined intermediate value; and that the control pawl (24) is movable between its first and its second stable positions by overcoming an over-deadcenter position of the control pawl (24) defined by a housing-fixed control cam face (58) and a member (56) bearing thereon under spring bias and mounted on the two-armed lever.

5. A belt webbing retractor for a vehicle safety belt system having a belt spool (12) rotatably mounted in a housing (10) of the retractor for taking up webbing and a belt withdrawal blocking mechanism which comprises a control disc (16) having at its outer periphery control teeth (18) and which control disc is rotatable relative to the belt spool (12) to activate the blocking mechanism, characterized in that:

a feeler (26) biased into engagement with the outer periphery of the webbing coil (B) has control faces with which at least one actuating arm (34; 54) of a control pawl (24) pivotally mounted on the housing (10) cooperates;

the control pawl (24) is movable between a first stable position in which its pawl tip (30) engages the control teeth (18) and a second stable position in which it is moved away from the control teeth (18);

the feeler (26) following the outer diameter of the webbing coil (B) moves the control pawl (24) into its first stable position when the outer diameter of the webbing coil (B) has reached a predetermined minimum value and into its second stable position when said outer diameter has reached a predetermined intermediate value;

the control pawl (24) is movable between its first and its second stable positions by overcoming an over-deadcenter position; and that that the over-deadcenter position of the control pawl (24) is defined by a pressure spring (70) which bears with its one end on an auxiliary lever (74) pivotally mounted on a housing-fixed pin (76) and with its other end on the actuating arm (54) of the control pawl (24) remote from the pawl tip (30), said auxiliary lever being connected with play to the actuating arm (54) in the manner of a toggle lever joint.

6. A belt webbing retractor for a vehicle safety belt system having a belt spool (12) rotatably mounted in a housing (10) of the retractor for taking up webbing and a belt withdrawal blocking mechanism which comprises a control disc (16) having at its outer periphery control teeth (18) and which control disc is rotatable relative to the belt spool (12) to activate the blocking mechanism, characterized in that:

a feeler (26) biased into engagement with the outer periphery of the webbing coil (B) has control faces with which at least one actuating arm (34; 54) of a control pawl (24) pivotally mounted on the housing (10) cooperates;

the control pawl (24) is movable between a first stable position in which its pawl tip (30) engages the control teeth (18) and a second stable position in which it is moved away from the control teeth (18);

the feeler (26) following the outer diameter of the webbing coil (B) moves the control pawl (24) into its first stable position when the outer diameter of the webbing coil (B) has reached a predetermined minimum value and into its second stable position when said outer diameter has reached a predetermined intermediate value;

the control pawl (24) forms a two-armed lever having one arm on which the pawl tip (30) is formed and having another arm which is guided at one of the control faces of the feeler (26); and that the control faces of the feeler (26) are formed on a two-pronged portion (50, 52) of the feeler (26).

* * * * *

UNITED STATES PATENT AND TRADEMARK OFFICE
CERTIFICATE OF CORRECTION

PATENT NO. : 5,176,335

DATED : January 5, 1993

INVENTOR(S) : Wolf-Dieter Honl and Hermann Weller

It is certified that error appears in the above-identified patent and that said Letters Patent is hereby corrected as shown below:

Column 6, Line 55, Claim 3, Change "pad" to --pawl--.

Signed and Sealed this

Second Day of November, 1993

Attest:

BRUCE LEHMAN

*Attesting Officer*      *Commissioner of Patents and Trademarks*